United States Patent Office 2,858,194
Patented Oct. 28, 1958

2,858,194

PRODUCTION OF HEXASODIUM HEXACARBONYL

Henry C. Miller, Wilmington, Del., assignor to E. I. du Pont de Nemours and Company, Wilmington, Del., a corporation of Delaware No Drawing. Application June 14, 1956
Serial No. 591,264

4 Claims. (Cl. 23—203)

This invention relates to an improved process for the preparation of the hexasodium salt of hexahydroxybenzene, frequently also referred to as sodium carbonyl and sometimes as hexasodium hexacarbonyl, and having the empirical formula $(NaCO)_6$.

The reaction between metallic sodium in liquid ammonia with carbon monoxide is known to give a solid of the empirical formula NaCO. This product is indicated to be a two-carbon compound, i.e. $(NaCO)_2$, since on recation with water, alcohols, or acids, glycolic acid is the main product, see Scott, Science 115, 118 (1952). This product is extremely difficult to handle, being unstable to any protonating agent (i. e., a compound having a mobile hydrogen atom, e. g., water, acids, and the like), as well as to air, heat, and even friction, with substantial detonation upon exposure to the latter three.

Processes for the preparation of a hexameric sodium carbonyl $(NaCO)_6$ and the hydrolyzed, acylated, and esterified derivatives thereof are disclosed in U. S. Patent 2,736,752. This patent discloses that the hexacarbonyl of sodium can be prepared in a relatively smooth reaction by heating for four hours or more molar quantities of sodium and carbon monoxide in a closed system at elevated temperatures and pressures. Superatmospheric pressure is a critical factor and, irrespective of the temperature being employed, the pressure must be in excess of 30 atmospheres and can range up to 180 atmospheres and preferably is from 70-90 atmospheres. This process admittedly is an advance over the prior liquid ammonia synthesis, since the superatmospheric pressure product is relatively stable to heat and friction; however, the well-known higher initial and continuing costs resulting from the pressures necessary to the process make it undesirable.

It is an object of this invention to provide a new and improved process for the production of hexasodium hexacarbonyl.

It is a more specific object of this invention to provide a simplified process whereby sodium and carbon monoxide may be converted to good yields of hexasodium hexacarbonyl in a relatively short period of time.

These objects may be accomplished by passing carbon monoxide into contact with molten sodium at a temperature of 250° to 380° C. at approximately atmospheric pressure.

It has now surprisingly been found that shock-insensitive, thermally-insensitive, and only mildly pyrophoric hexameric sodium carbonyl, i. e., the hexasodium salt of hexahydroxybenzene, can be prepared in simple equipment, including even conventional laboratory glass equipment, by the direct interaction between metallic sodium and carbon monoxide gas at pressures substantially no greater than atmospheric pressure at temperatures ranging from about 250° to about 380° C., and preferably between 280° and 340° C. In contrast to the elevated pressure reaction of U. S. Patent 2,736,752, which requires four hours or more, half molar quantities of sodium are converted to the carbonyl in a matter of minutes at atmospheric pressure.

The following example is submitted to illustrate the invention in detail, it being understood the specific details given therein in no way limit the scope of the invention.

EXAMPLE

Preparation of hexasodium hexacarbonyl

A reactor fitted with heating and stirring means was charged with 5.85 parts of freshly filtered molten sodium. The reactor was then flushed with gaseous carbon monoxide and the internal temperature slowly raised while stirring and maintaining a slow stream of carbon monoxide gas through the reactor at atmospheric pressure. At 250° to 280° C., carbon monoxide was absorbed very slowly and the molten sodium metal solidified into a gray, crystalline, metallic appearing solid. As the temperature was raised above 300° C., a rapid exothermic reaction occurred and the solid product turned black with rapid absorption of carbon monoxide. Heating was discontinued at once but the internal temperature within the reactor rose within three to five minutes to 340° C., at which point carbon monoxide absorption ceased and the formation of $(NaCO)_6$ was essentially complete. The reaction mixture was held at 340° C. for an additional hour in an atmosphere of carbon monoxide and then allowed to cool slowly to room temperature under carbon monoxide pressure, i. e., 10-20 mm. Hg. There was thus obtained the crude hexasodium salt of hexahydroxybenzene as a dark, solid product, pyrophoric and electrically conductive and exhibiting a crystalline X-ray diffraction pattern.

The rapid exothermic reaction above referred to will take place upon heating between 250° and 380° C., depending upon the time of heating.

A sample of the above hexasodium salt suspended in dioxane was hydrolyzed with water and a sample was taken of the gas given off by such hydrolysis. The hydrolyzed mixture was then acidified by addition of 10 N sulfuric acid and a second gas sample taken. Analysis of the two gas samples obtained showed the crude product to contain 11% of unreacted sodium, 1.3% of sodium acetylide, calculated as $Na_2C_2$, and 7% of sodium carbonate. The hydrolysate was colored but clear and gave no indication of containing free carbon. Thus, the crude product obtained directly by interaction of the molten metal and carbon monoxide contained 81.7% of the hexasodium salt of hexahydroxybenzene.

Most of the unreacted sodium can be removed from this product by distillation under reduced pressure. The purified hexasodium salt of hexahydroxybenzene obtained after removal of unreacted sodium is no longer electrically conductive.

Conversion of the hexasodium hexacarbonyl to rhodizonic acid and hexaacetoxybenzene A sample of the above crude hexasodium salt of hexahydroxybenzene was treated with absolute alcohol, the reaction mixture acidified with concentrated hydrochloric acid, and the resultant precipitate (largely sodium chloride) removed by filtration. An aqueous solution of this crude precipitate, buffered by the addition of sodium acetate, gave a bright red precipitate upon the addition of barium chloride, thereby indicating the presence of rhodizonic acid (1,2-dihydroxy-3,4,5,6-tetraketocyclohexene).

The filtrate from the removal of the sodium chloride-containing precipitate was evaporated to dryness and the dark residue refluxed with acetic anhydride and zinc dust for two hours. The resultant reaction mixture was filtered while hot to remove the solid zinc salts. Upon cooling the filtrate there was obtained fine needles of crude hexaacetoxybenzene. Recrystallization from acetic acid and sublimation resulted in the isolation of the pure hexaacetoxybenzene as white needle crystals melting at 208°—

210° C. versus a reported melting point of 203° C. (Nietzki and Benckiser, Ber. 18, 507 (1885)).

*Analysis.*—Calc'd for $C_{18}H_{18}O_{12}$: C, 50.8%; H, 4.2%. Found: C, 51.5%, 51.4%; H, 4.4%, 4.4%.

As is apparent from the foregoing example, the improved process of this invention is extremely simple and requires only the simplest operating equipment. Only two reactants are called for, that is, metallic sodium and gaseous carbon monoxide. The reaction proceeds promptly at atmospheric pressure or even at reduced pressure, though less rapidly. In the simplest and therefore most preferred procedure, the gaseous reactant is passed into and through the reaction zone under a slight positive pressure, e. g., of the order of about 10–20 mm. Hg above atmospheric pressure.

The reaction proceeds at temperatures between 250° and as high as 380° C., although it is generally desirable to keep the maximum reaction temperature below about 340° C. As noted in the foregoing, the reaction is exothermic at about 300° C. and spontaneously generates a reaction zone temperature of 340° C. or higher. The addition of inert gases such as nitrogen or methane through the reaction zone does not change the course of reaction, except as to afford a convenient means of controlling the exothermic reaction and thereby preventing undesirable local overheating.

The reaction once started proceeds quite rapidly and normally is over in a few minutes, depending on the amount of sodium and the availability rate of carbon monoxide. Reaction times will seldom exceed about an hour. Obviously, longer times can be used but no advantage is gained thereby.

The metallic sodium used desirably is substantially pure, although in some cases up to 10% or so of other alkali metals such as lithium or potassium, or alkaline earth metals such as calcium, are effective in affording a better subdivision of the sodium. Sodium amalgam can also be used but for obvious reasons the most preferred and simplest form of the reactant is the commercially available metallic sodium.

Adequate stirring or, better, grinding is effective in promoting the reaction. As illustrated in the foregoing, once the reaction has proceeded to a substantial absorption stage of carbon monoxide the reaction is between the gaseous carbon monoxide and the solid intermediate mixture of metallic sodium and sodium carbonyl. In other words, while at the start of the reaction the metallic sodium is in the molten, i. e., liquid stage, as the reaction proceeds only a short distance towards complete carbon monoxide absorption, the solid sodium carbonyl first formed apparently absorbs or intermixes with the unreacted metallic sodium, giving an over-all solid phase.

As illustrated in the specific example, the hexasodium salt of hexahydroxybenzene obtained is easily converted to the known hexaacetoxybenzene. Likewise, as illustrated specifically in the example, oxidation to rhodizonic acid can be achieved. Similarly, the known and useful products, tetrahydroxyquinone, triquinolyl, croconic acid, and leuconic acid, can be obtained from the reaction product by hydrolysis to hexahydroxybenzene and subsequent oxidation. Furthermore, the hexasodium salt of hexahydroxybenzene can be hydrolyzed to hexahydroxybenzene and the latter in turn hydrogenated to the known and useful inositol. From the foregoing, it is apparent that if hexahydroxybenzene is the desired final product, hydrolysis with protonating agents such as water or acids, e. g., acetic acid, and the like, should be carried out in the absence of oxygen since otherwise the above-identified oxidation products are obtained.

Throughout the specification and claims, any reference to parts, proportions, and percentages refers to parts, proportions, and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. The process for the production of hexasodium hexacarbonyl which comprises passing carbon monoxide into contact with sodium at a temperature of 250° C. to 380° C. at approximately atmospheric pressure for a period of not to exceed 1 hour.

2. The process for the production of hexasodium hexacarbonyl which comprises passing carbon monoxide into contact with sodium at a temperature of 280° C. to 340° C. at approximately atmospheric pressure for a period of not to exceed 1 hour.

3. The process for the production of hexasodium hexacarbonyl which comprises passing carbon monoxide into contact with sodium at a temperature of 280° C. to 340° C. at approximately atmospheric pressure for a period of not to exceed 1 hour, and distilling unreacted sodium therefrom.

4. The process for the production of hexasodium hexacarbonyl which comprises passing carbon monoxide into contact with sodium at a pressure not to exceed 10–20 mm. Hg above atmospheric pressure while heating the latter to a temperature of about 300° C. until a rapid exothermic reaction takes place, discontinuing heating, and maintaining the temperature of the reactants below 380° C. until reaction between the sodium and carbon monoxide is substantially complete.

References Cited in the file of this patent

UNITED STATES PATENTS 2,736,752  Hoffmann et al. _____ Feb. 28, 1956